(No Model.)
G. E. LUCKEY.
PORTABLE HAY PRESS.
No. 396,042. Patented Jan. 8, 1889.
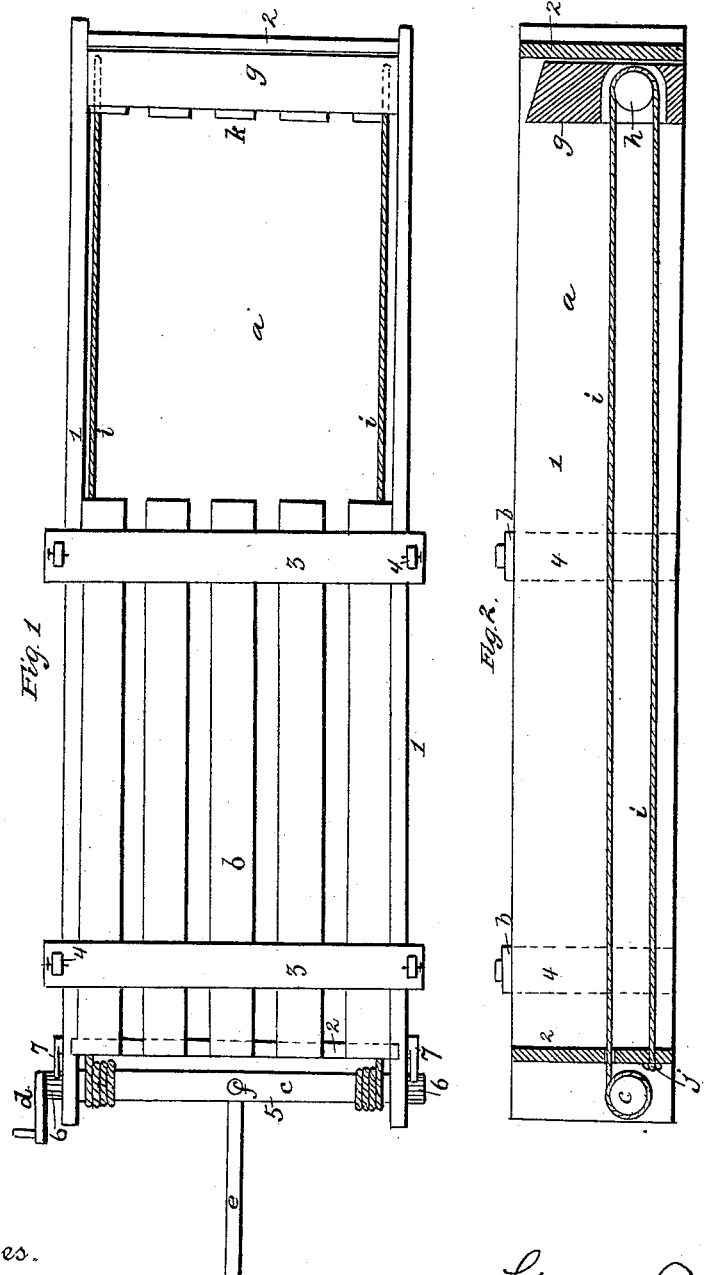
Witnesses.
M. P. McKee.
L. M. Bartlett.
Inventor
George E. Luckey
by F. B. Brock
Attorney.

UNITED STATES PATENT OFFICE.

GEORGE ELLERY LUCKEY, OF PARIS, TENNESSEE, ASSIGNOR OF ONE-HALF TO W. DEVEREAUX KENDALL, OF SAME PLACE.

PORTABLE HAY-PRESS.

SPECIFICATION forming part of Letters Patent No. 396,042, dated January 8, 1889.

Application filed March 19, 1888. Serial No. 267,687. (No model.)

*To all whom it may concern:*

Be it known that I, GEORGE ELLERY LUCKEY, a citizen of the United States, residing at Paris, in the county of Henry and State of Tennessee, have invented certain new and useful Improvements in Portable Hay-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

Figure 1 is a plan view of a device embodying my invention. Fig. 2 is a vertical section of the same.

My improvements relate to hay-presses.

The invention consists of the combination and construction of the following parts, a particular description of which will first be offered, and the points of novelty then set forth in the claim.

The object of the improvement is to make a portable hay-press which is mainly adapted for use upon an ordinary farm-wagon, but which may be used in other positions.

In the drawings, $a$ represents the main frame of the press, which is preferably of rectangular form.

1 1 represent the permanent side pieces, and 2 2 the end pieces, of the frame.

$b$ is preferably a slatted shutter or frame, adapted to lie across one end of frame $a$, and it has cross-pieces 3, which are attached adjustably to the side standards, 4 4. Frame $a$ has an open bottom.

$c$ is a windlass device located upon one end of the frame $a$.

5 is the rotating bar journaled in the sides 1, and having ratchet-wheels 6 located thereon.

7 7 are pawls pivoted upon the sides 1 1 and engaging the teeth of the ratchet-wheels 6.

$d$ is a hand-crank secured to the bar 5.

$e$ is a lever for working the windlass in addition to crank $d$, and is adapted to be inserted into a series of radial holes, $f$, pierced into or through the bar 5.

$g$ is a follower within the frame, and of substantially the same height.

$h$ is a pulley, of which there are two mounted on or within the follower $g$.

$i\ i$ are two ropes, preferably arranged along the sides of the frame. One end of each rope $i$ is secured fast at $j$, near the windlass, from which said rope passes to the follower and over its pulley on both sides, and thence back again to the windlass, over which it passes and to which it is secured.

In operation the hay to be pressed is placed within the frame beyond the shutter $b$, the frame itself being first laid upon the bottom of the farm-wagon. The crank is then turned and the follower brought forward. When the force required to properly compress the hay becomes quite great, the lever $e$ is brought into use. The hay is preferably compressed by a series of compressions, according to the size of the bale required. The follower $g$ is provided, preferably, with a series of slats, $k$. Through the slats upon the follower and shutter the tying of the bale after compression is expeditiously performed.

By making the hay-press with no bottom additional lightness and portability are secured. It is adapted for use upon the floor or bottom of an ordinary farm-wagon, and makes a cheaper, simpler, and less expensive hay-press than those heretofore constructed.

I claim as my invention and desire to secure by Letters Patent—

The combination, in a hay-press, of the bottomless frame having end and side walls, the removable top shutter arranged upon one end of the press, and a follower device comprising a follower, a rope or chain, and a windlass, the whole constituting a portable hay-press which may be used upon any suitable floor of a vehicle or building, substantially as herein described.

In testimony whereof I affix my signature in presence of two witnesses.

GEORGE ELLERY LUCKEY.

Witnesses:
W. R. COLLINS,
C. SWEENEY.